(12) United States Patent
Sung et al.

(10) Patent No.: US 11,463,614 B2
(45) Date of Patent: Oct. 4, 2022

(54) VEHICLE AND METHOD OF CONTROLLING VEHICLE IMAGE

(71) Applicants: Hyundai Motor Company, Seoul (KR); Kia Motors Corporation, Seoul (KR)

(72) Inventors: KapJe Sung, Gyeonggi-do (KR); Junsik An, Gyeonggi-do (KR); JoongRyoul Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 144 days.

(21) Appl. No.: 16/704,383

(22) Filed: Dec. 5, 2019

(65) Prior Publication Data

US 2020/0195839 A1 Jun. 18, 2020

(30) Foreign Application Priority Data

Dec. 17, 2018 (KR) .................. 10-2018-0162924

(51) Int. Cl.
| | |
|---|---|
| *H04N 5/232* | (2006.01) |
| *G06T 7/73* | (2017.01) |
| *B60R 1/00* | (2022.01) |
| *G06T 7/80* | (2017.01) |

(52) U.S. Cl.
CPC .......... *H04N 5/23216* (2013.01); *B60R 1/00* (2013.01); *G06T 7/74* (2017.01); *G06T 7/80* (2017.01); *H04N 5/232945* (2018.08); *B60R 2300/50* (2013.01); *G06T 2207/30252* (2013.01)

(58) Field of Classification Search
CPC .......... H04N 5/23216; H04N 5/232945; G06T 7/74; G06T 7/80; G06T 2207/30252; B60R 1/00; B60R 2300/50
USPC ....................................................... 348/148
See application file for complete search history.

(56) References Cited

U.S. PATENT DOCUMENTS

| | | | |
|---|---|---|---|
| 2009/0309970 A1* | 12/2009 | Ishii ................. | B62D 15/027 348/143 |
| 2016/0292882 A1* | 10/2016 | Comport ............ | G06T 7/248 |
| 2018/0246515 A1* | 8/2018 | Iwama .............. | G05B 13/0265 |

* cited by examiner

*Primary Examiner* — On S Mung
(74) *Attorney, Agent, or Firm* — Fox Rothschild LLP

(57) ABSTRACT

A vehicle provides a standardized and accurate image around the vehicle by changing an image obtained by the vehicle to a single reference and providing the changed image to a user terminal. The vehicle includes a communicator that communicates with the user terminal or a server and a camera that obtains an image around the vehicle. A controller then converts a surrounding image obtained by the camera into a reference image implemented with a predetermined parameter and transmits the reference image to the user terminal.

4 Claims, 14 Drawing Sheets

VEHICLE AND METHOD OF CONTROLLING VEHICLE IMAGE

CROSS-REFERENCE TO RELATED APPLICATION(S)

This application is based on and claims priority under 35 U.S.C. § 119 to Korean Patent Application No. 10-2018-0162924, filed on Dec. 17, 2018, the disclosure of which is incorporated by reference in its entirety.

TECHNICAL FIELD

The present disclosure relates to a vehicle, and more particularly to method of changing an image obtained by the vehicle to provide a standardized and accurate image around the vehicle, and a method of controlling a vehicle image.

BACKGROUND

A surround view uses four cameras, at the front and the rear of a vehicle and at the bottom of left and right side mirrors, respectively, to generate a top view screen on a navigation screen mimicking an image taken from the top of the vehicle. Using a surround view monitoring system, a driver may learn the situation around the vehicle at a glance, park securely, or drive down a narrow path.

In recent years, a technology for remotely identifying the surround view through a user terminal has been developed. However, when the surround view is provided through the user terminal, information provided by an image is inaccurate depending on a viewpoint of a virtual camera, and in particular, the information at the boundary of the image is unclear. Therefore, it is necessary to solve the above-mentioned problem in providing the image around the vehicle to the user terminal.

SUMMARY

Additional aspects of the disclosure will be set forth in part in the description which follows and, in part, will be obvious from the description, or may be learned by practice of the disclosure. In accordance with an aspect of the disclosure, a vehicle may include: a communicator configured to communicate with a user terminal or a server; a camera configured to obtain an image around the vehicle; and a controller configured to convert a surrounding image obtained by the camera into a reference image implemented with a predetermined parameter, and to transmit the reference image to the user terminal.

The user terminal may be configured to receive the reference image, and to associate the reference image with predetermined coordinate information. The user terminal may also be configured to generate at least one matrix that corresponds to a virtual camera that determines a viewpoint of the reference image. The at least one matrix may include a model matrix for determining a reference view of the reference image. In addition, the at least one matrix may include a viewpoint matrix that determines a position of the virtual camera. The at least one matrix may also include a projection matrix for determining internal parameters of the virtual camera.

Further, the user terminal may be configured to receive a user's command that changes the viewpoint, and change the viewpoint based on the user's command to output the reference image. The user terminal may then be configured to output the reference image at a predetermined viewpoint when the user's command exceeds a predetermined range. The user terminal may also be configured to receive the user's command including an area of interest around the vehicle, and output the reference image that corresponds to the area of interest.

In accordance with another aspect of the disclosure, a method of controlling a vehicle image may include: communicating, by a communicator, with a user terminal and a server; obtaining, by a camera, an image around a vehicle; converting, by a controller, a surrounding image obtained by the camera into a reference image implemented with a predetermined parameter; and transmitting, by the controller, the reference image to the user terminal.

The method may further include: associating, by the user terminal, the reference image with predetermined coordinate information and generating, by the user terminal, at least one matrix that corresponds to a virtual camera that determines a viewpoint of the reference image. The at least one matrix may include a model matrix for determining a reference view of the reference image. Additionally, the at least one matrix may include a viewpoint matrix that determines a position of the virtual camera. The at least one matrix may also include a projection matrix for determining internal parameters of the virtual camera.

The method may further include: receiving, by a user controller, a user's command that changes the viewpoint; and outputting, by the user controller, the reference image by changing the viewpoint based on the user's command. The outputting of the reference image may include outputting the reference image at a predetermined viewpoint when the user's command exceeds a predetermined range and receiving the user's command including an area of interest around the vehicle; and outputting the reference image that corresponds to the area of interest.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
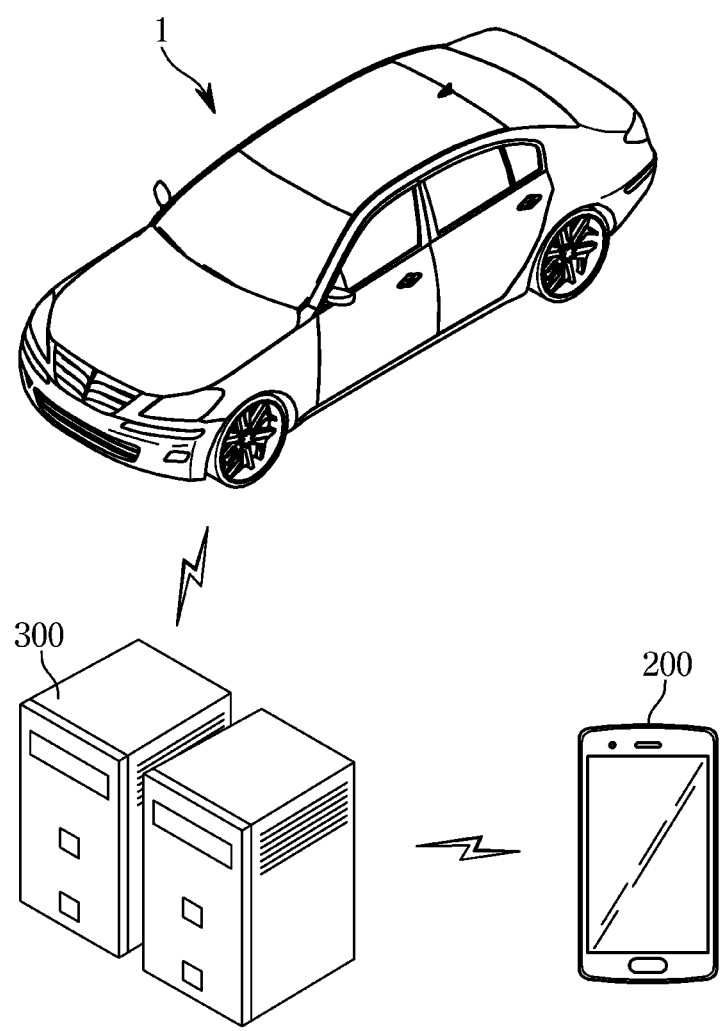
FIG. 1 is a view describing communication between a vehicle, a server and a user terminal according to exemplary embodiments of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Hereinafter, an operation principle and exemplary embodiments of the disclosure will be described with reference to accompanying drawings. FIG. 1 is a view for describing communication between a vehicle, a server and a user terminal according to exemplary embodiments of the disclosure. Referring to FIG. 1, a vehicle 1 may be configured to communicate with a server 300 and the server 300 may be configured to communicate with a user terminal 200.

The server 300 may be a processor configured to monitor and control an entire network, may be configured to connect to another network via a mainframe or a public network, and may share hardware resources such as software resources or other equipment. The user terminal 200 may be implemented as a computer or a portable terminal capable of accessing the vehicle 1 or the server 300 via a network. In particular, the computer may include, for example, a notebook, a desktop, a laptop, a tablet PC, a slate PC, and the like, each of which is equipped with a WEB Browser. The user terminal 200 may include, for example, a wearable device such as a Personal Communication System (PCS), or the like as a wireless communication device that is portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and contact lens, or a head-mounted-device (HMD).

The user terminal 200 may be configured to communicate with the server 300 and transmit an image transmission request signal. The server 300 may be configured to transmit an image transmission command including a wake up command to the vehicle 1. The vehicle 1 may be configured to obtain an image around the vehicle 1 (e.g., of a vehicle surrounding) based on a signal received from the server 300, convert the obtained image into an operation to be described later, and transmit the converted image to the server 300. The server 300 may be configured to receive the image from the vehicle 1 and transmit the received image to the user terminal 200. The user terminal 200 may then be configured to convert the received image based on the operation to be described later and output the converted image to the user terminal 200. Detailed operations related to this will be described herein below.

Figure 2:
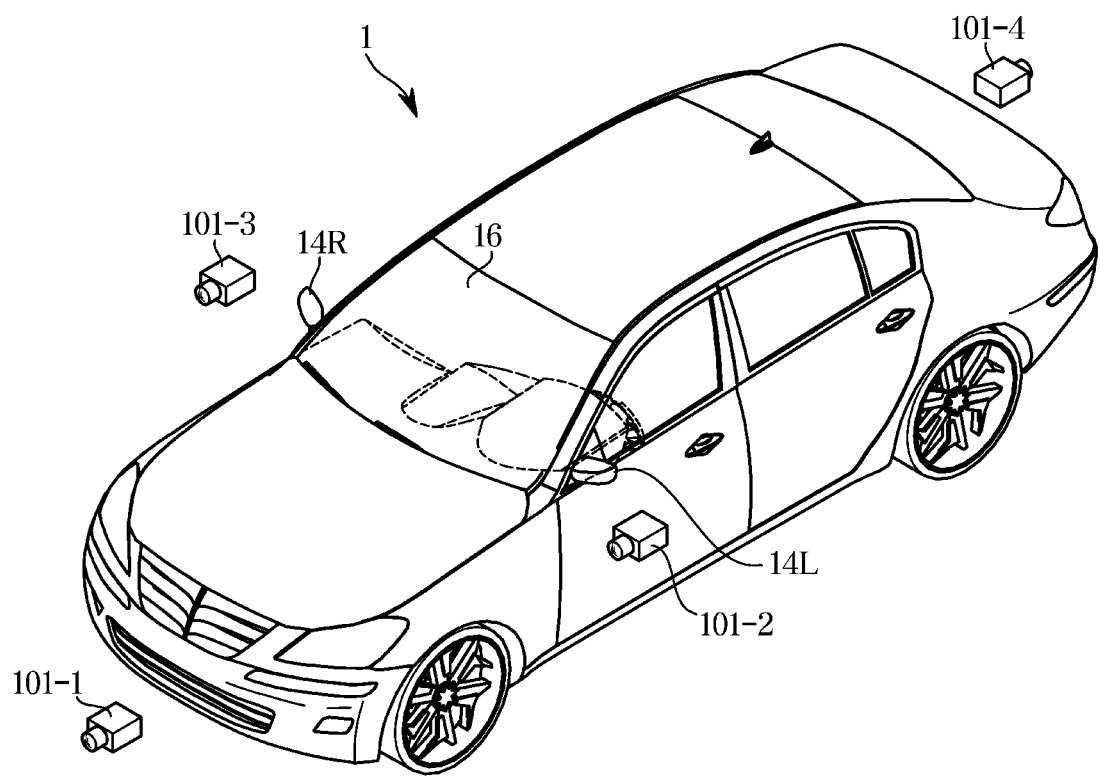
FIG. 2 is a view describing a camera provided in a vehicle according to exemplary embodiments of the disclosure.

FIG. 2 is a view describing a camera provided in a vehicle. Notably, the present disclosure is not limited to a camera and may including any type of imaging device. Referring to FIG. 2, the vehicle 1 may include a vehicle body 10 that forms the exterior of the vehicle, and wheels 12 and 13 for moving the vehicle 1. The vehicle body 10 may include a hood 11a for protecting various devices required for driving the vehicle 1, a roof panel 11b that forms an internal space, a trunk lid 11c of a trunk compartment, front fenders 11d disposed on the sides of the vehicle 1, and quarter panels 11e. Additionally, a plurality of doors 14 may be disposed on the sides of the vehicle body 10 and hinged to the vehicle body 10.

A front window 19a is disposed between the hood 11a and the roof panel 11b for providing a view ahead of the vehicle 1, and a rear window 19b is disposed between the roof panel 11b and the trunk lid 11c for providing a view behind the vehicle 1. Side windows 19c may also be disposed at the upper part of the doors 14 to provide side views. Headlamps 15 may be disposed at the front of the vehicle 1 for illuminating a direction in which the vehicle 1 is being driven. Turn signal lamps 16 may also be disposed on the front and back of the vehicle 1 for indicating a direction in which the vehicle 1 will turn.

Further, the vehicle 1 may be configured to operate the turn signal lamps 16 to blink to indicate a turning direction. The turn signal lamps 16 may be provided both in front of and behind the vehicle 1. Tail lamps 17 may also be disposed at the back of the vehicle 1. The tail lamps 17 may indicate a state of gear shift, a state of brake operation of the vehicle 1, etc. At least one controller 130 may be provided within the vehicle 1. The controller 130 may be configured to perform electronic control related to the operation of the vehicle 1. The controller 130 may be installed at an arbitrary position inside the vehicle 1 according to a designer's selection.

For example, the controller 130 may be installed between an engine room and a dashboard, or may be provided inside a center fascia. The controller 130 may include at least one processor configured to receive an electrical signal, process the input electrical signal, and output the processed electrical signal. The processor may be implemented with at least one semiconductor chip and associated components. The semiconductor chip and related components may be installed on a printed circuit board that may be installed inside the vehicle 1. Additionally, the vehicle 1 may include a camera 110 configured to obtain the image necessary for autonomous driving of the vehicle 1.

Particularly, the camera 110 may include a plurality of cameras 101-1, 101-2, 101-3, and 101-4. The cameras 101-1, 101-2, 101-3, and 101-4 may be configured to capture or obtain images around the vehicle 1 and may respectively be disposed on the front, rear, and sides of the vehicle 1. The images obtained by the cameras 101-1, 101-2, 101-3, and 101-4 may be derived as the image around the vehicle 1 by a method described later.

Figure 3:
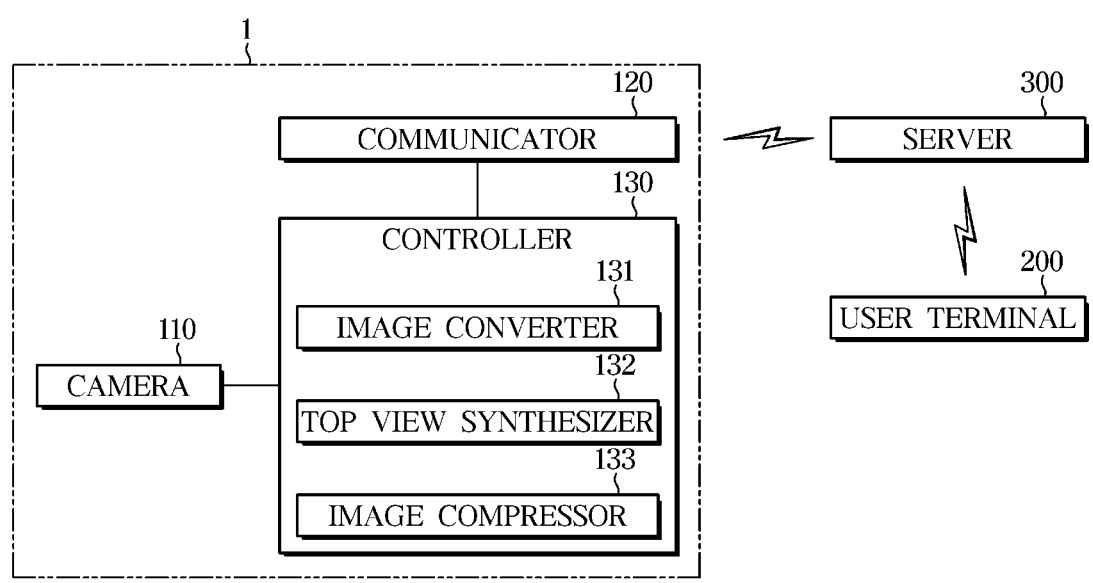
FIG. 3 is a control block diagram according to exemplary embodiments of the disclosure.

FIG. 3 is a control block diagram according to exemplary embodiments of the disclosure. Referring to FIG. 3, the vehicle 1 may include the camera 110, a communicator 120, and the controller 130. The vehicle 1 may be configured to communicate with the server 300 and the user terminal 200. The camera 110 may be configured to obtain images around the vehicle 1. The camera 110 may be disposed within the side mirrors 14R and 14L of the vehicle 1 to obtain images around the vehicle 1.

Particularly, the camera 110 may include a charge-coupled device (CCD) camera or a CMOS color image sensor. Both the CCD and the CMOS refer to a sensor that converts light received through the lens of the camera 110 into an electric signal and stores the electric signal. In particular, the CCD camera 110 may be a device configured to convert the image into the electric signal using the charge-coupled device. Additionally, the CMOS Image Sensor (CIS) may refer to a low-consumption, low-power type image pickup device having a CMOS structure and perform as an electronic film of a digital device. In general, the CCD is more sensitive than the CIS and may be used in the vehicle 1, but is not necessarily limited thereto.

Furthermore, the controller 130 may be configured to convert the image around the vehicle 1 obtained by the camera 110 into a reference image that is implemented as a predetermined parameter. Detailed operations related to this will be described later. The controller 130 may be configured to operate the communicator 120 to transmit the reference image to the user terminal 200. The controller 130 may include an image converter 131, a top view synthesizer 132, and an image compressor 133. Details related to the above-mentioned contents will be described later.

The controller 130 may include a memory (not shown) configured to store an algorithm to operate the components in the vehicle 1 or data regarding a program that executes the algorithm, and a processor (not shown) configured to perform the aforementioned operation using the data stored in the memory. The memory and the processor may be implemented in separate chips. Alternatively, the memory and the processor may be implemented in a single chip.

The communicator 120 may be configured to communicate with at least one of the user terminal 200 and the server 300. The communicator 120 may include one or more components that enable communication with an external device, for example, at least one of a short-range communication module, a wired communication module, and a wireless communication module. The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or plain old telephone service (POTS).

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

At least one component may be added or deleted corresponding to the performance of the components of the vehicle 1 illustrated in FIG. 3. It will be readily understood by those skilled in the art that the mutual position of the components may be changed corresponding to the performance or structure of the vehicle 1. In the meantime, each of the components shown in FIG. 3 may be referred to as hardware components such as software and/or a field programmable gate array (FPGA) and an application specific integrated circuit (ASIC).

Figure 4:
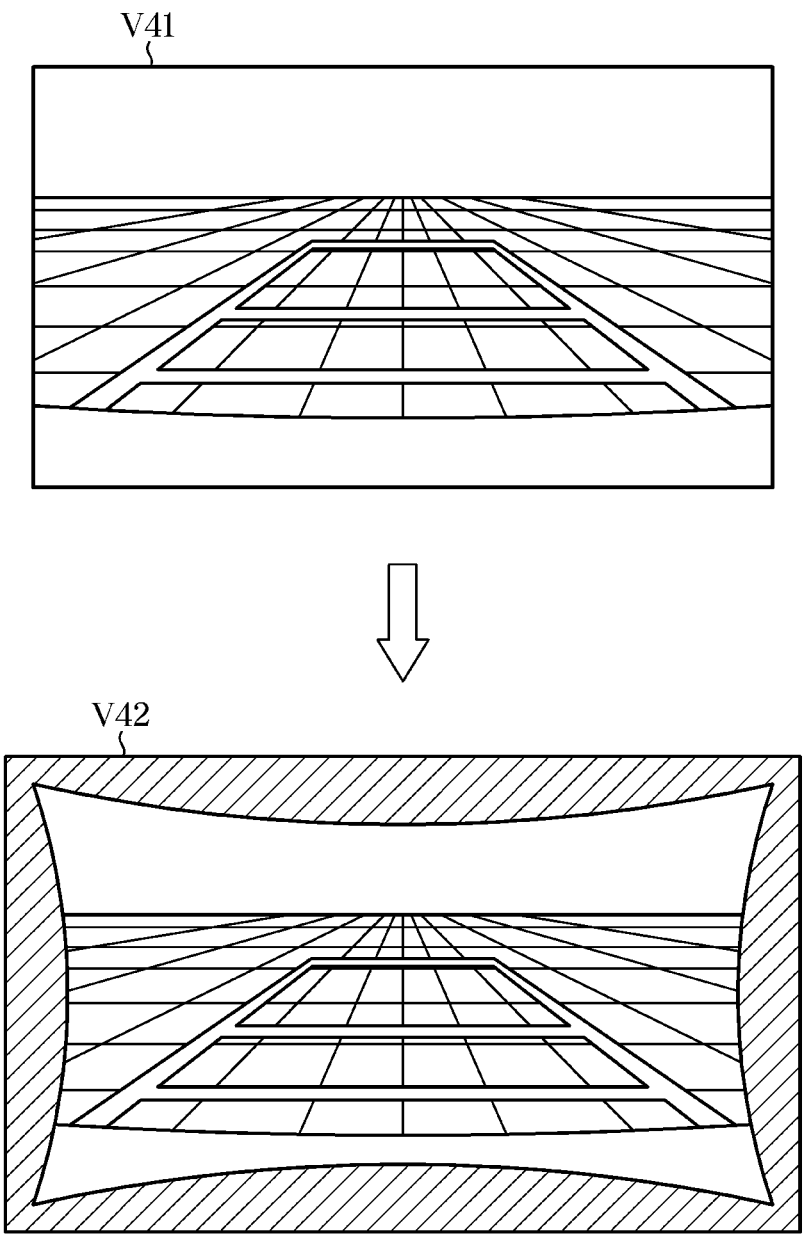
FIG. 4 is a view describing an operation of generating a reference image according to exemplary embodiments of the disclosure.

Moreover, FIG. 4 is a view describing an operation of generating a reference image according to exemplary embodiments of the disclosure. Referring to FIG. 4, when a user inputs a user command through the user terminal 200, the vehicle 1 may be configured to obtain an image V41 around the vehicle 1 through the camera 110. In other words, in response to receiving a user input, the controller within the vehicle may be configured to operate the camera to obtain an image of the surrounding environment of the vehicle.

The controller 130 may be configured to convert the image V41 around the vehicle 1 obtained by the camera into a reference image V42, respectively. In particular, the controller 130 may be configured to convert the image around the vehicle 1 to the reference image so that it operates regardless of camera specifications. The controller 130 may refer to the reference image, which is an original image converted into a single fixed parameter image. The controller 130 may be configured to change intrinsic parameters and not the other parameters.

Particularly, even when camera lenses or resolution changes in the future, the controller 130 may be configured to convert the resolution or distortion characteristics into a single parameter value when converted to the reference image. Based on the above-described operation, the user terminal 200 may always receive the same reference image and output the image without updating even when the camera 110 is changed.

The above-described operation may be performed in the image converter 131 provided in the controller 130. In addition, the image compressor 133 provided in the controller 130 may be configured to compress the reference image and a top view image, and transmit the compressed image to the communicator 120. The communicator 120 may then be configured to transmit the image and data to the server 300.

The above-described operation may refer to the operation of converting the obtained image of the vehicle 1 into the reference image implemented as the single parameter, receiving the image obtained by the camera 110, and identifying the image around the vehicle 1 at a free viewpoint from the user terminal 200. The operation is not limited as long as it is the operation of converting from the vehicle 1 into the reference image.

Figure 5:
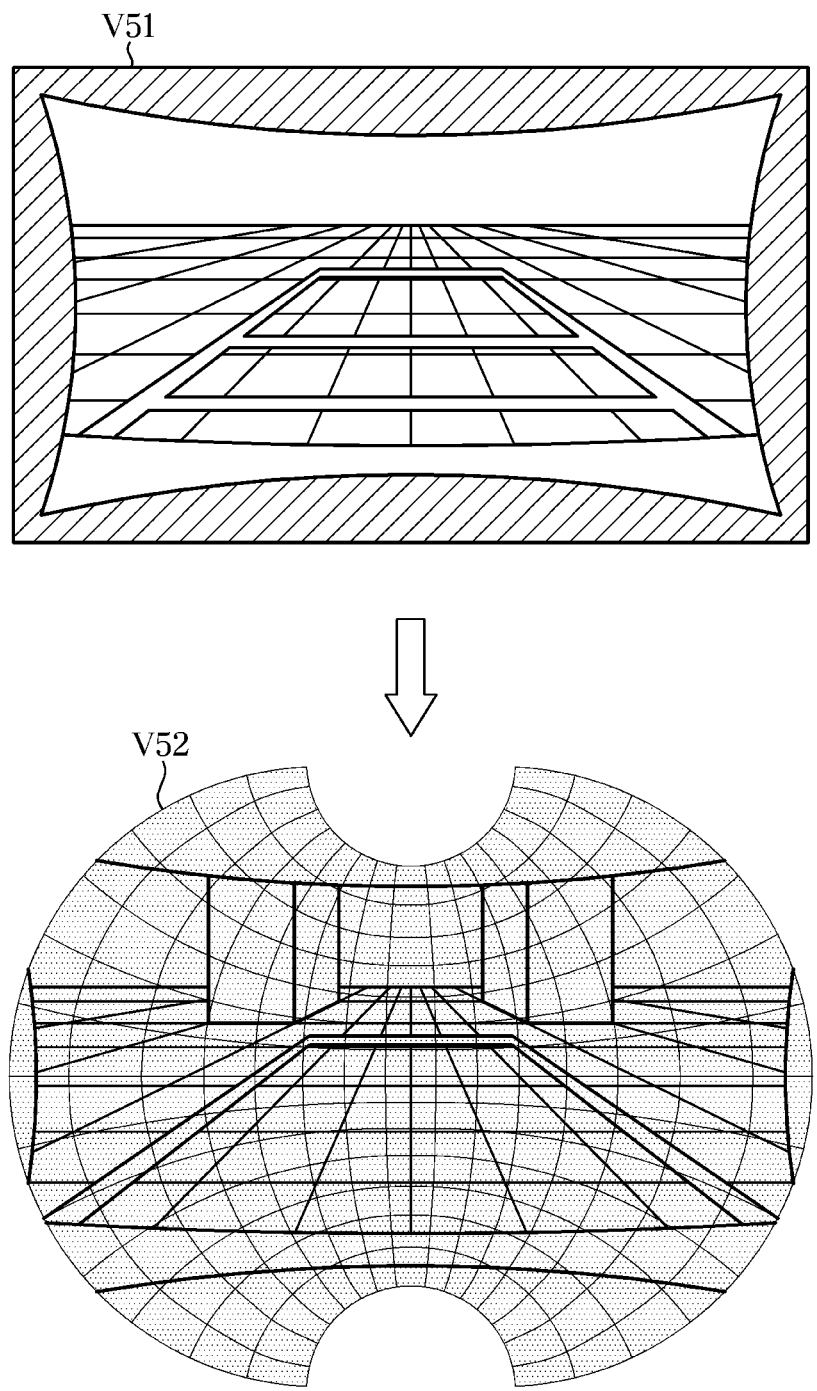
FIG. 5 is a view describing an operation of mapping coordinate information to a reference image according to exemplary embodiments of the disclosure.

Furthermore, FIG. 5 is a view describing an operation of mapping coordinate information to a reference image according to exemplary embodiments of the disclosure. Referring to FIG. 5, the user terminal 200 receiving a reference image V51 from the vehicle 1 may correspond to the reference image and predetermined coordinate information V52.

Particularly, the user terminal 200 may provide a view of the free viewpoint using a three-dimensional (3D) rendering technique. The user terminal 200 may construct a spherical 3D mesh and configure the coordinates of the texture to be mapped to each vertex. At this time, the vertex 3D coordinates and the 2D texture coordinates of the mesh may be stored in the user terminal 200 using a look-up table (LUT). Since the user terminal 200 receives and uses the reference image, it may be applied to a single unified LUT regardless of the vehicle type, camera specifications, and camera position. When the user terminal 200 constructs the spherical mesh using the LUT and map the front/rear/left/right reference image to the texture, the center of the reference image may be mapped to the center of a spherical surface as illustrated in FIG. 5.

Figure 6:
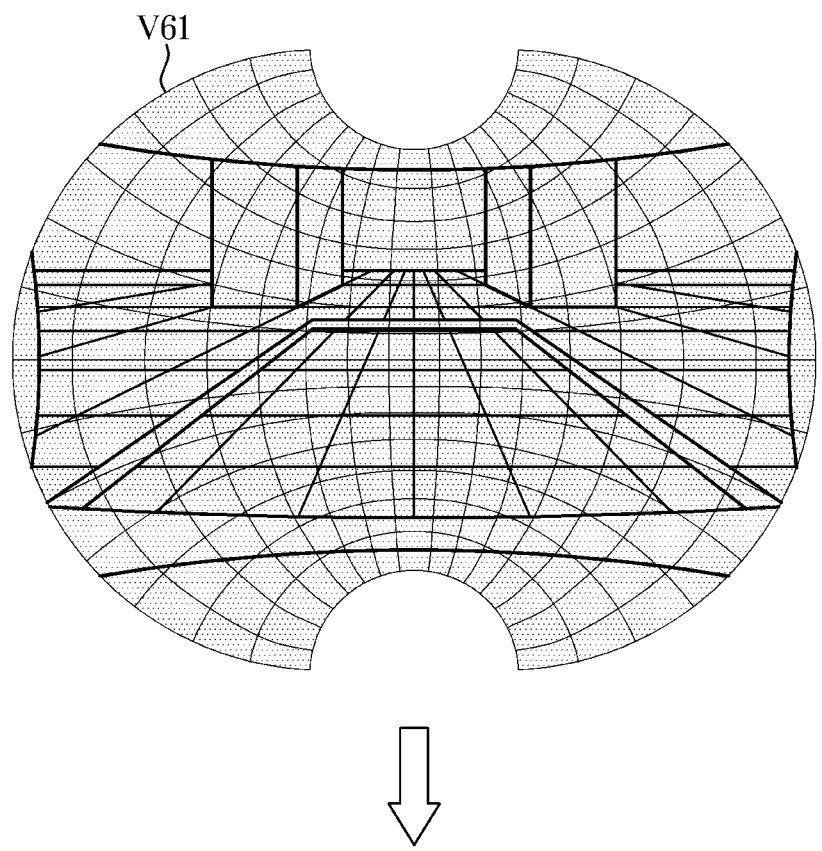
FIG. 6 is a view describing an operation of mapping a matrix to a reference image according to exemplary embodiments of the disclosure.
Figure 6:
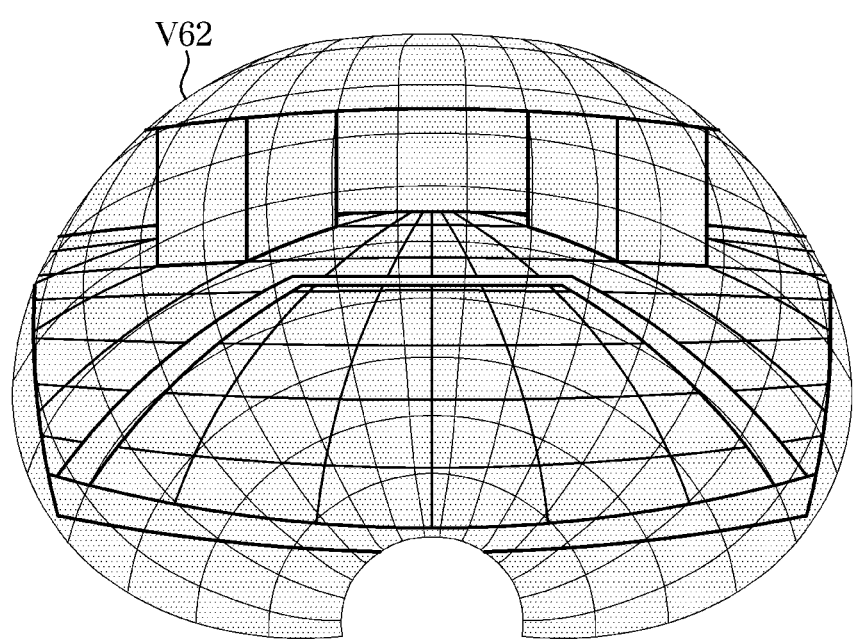

FIG. 6 is a view describing an operation of mapping a matrix to a reference image according to exemplary embodiments of the disclosure. Following the operation of FIG. 5, the user terminal 200 may be configured to generate at least one matrix that corresponds to the virtual camera that determines the viewpoint of the reference image. On the other hand, the matrix to which the user terminal 200 is applied to the reference image may be applied as follows.

$$\text{Mat} = Mm \times Vm \times Pm \qquad \text{Equation 1}$$

A matrix Mat applied to the reference image may be expressed by the product of a model matrix Mm, a viewpoint matrix Vm, and a projection matrix Pm.

The viewpoint matrix may reflect a mounting angle of each of the cameras on the spherical surface to which the reference image is mapped. The user terminal 200 may implement the viewpoint matrix as described below using pitch, yaw, and roll values received $$Mm = \begin{bmatrix} \cos(Y_{real}) & 0 & \sin(Y_{real}) & 0 \\ 0 & 1 & 0 & 0 \\ -\sin(Y_{real}) & 0 & \cos(Y_{real}) & 0 \\ 0 & 0 & 0 & 1 \end{bmatrix} . \qquad \text{Equation 2}$$

$$\begin{bmatrix} 1 & 0 & 0 & 0 \\ 0 & \cos(0.5\pi - P_{real}) & -\sin(0.5\pi - P_{real}) & 0 \\ 0 & \sin(0.5\pi - P_{real}) & \cos(0.5\pi - P_{real}) & 0 \\ 0 & 0 & 0 & 1 \end{bmatrix} .$$

$$\begin{bmatrix} \cos(-\pi - R_{real}) & 0 & \sin(-\pi - R_{real}) & 0 \\ 0 & 1 & 0 & 0 \\ -\sin(-\pi - R_{real}) & 0 & \cos(-\pi - R_{real}) & 0 \\ 0 & 0 & 0 & 1 \end{bmatrix}$$

The model matrix Mm may be implemented with the matrix described above, and each of Yreal, Preal, and Rreal may refer to the yaw, pitch, and roll values of the camera 110 mounted on the vehicle 1.

The user terminal 200 may have the respective model matrices Mm for each of the cameras 110 and may be configured to receive and output the image without performing additional calculations thereafter when it is calculated when receiving the mounting angle value. On the other hand, applying the model matrix Mm to the reference image compensates for the degree of the camera 110 misalignment, so that the angles of the initial virtual camera may be set to be the same (V61→V62).

On the other hand, the viewpoint matrix Vm may be prepared as follows.

$$Vm = \begin{bmatrix} 1 & 0 & 0 & 0 \\ 0 & \cos(-P_{virtual}) & -\sin(-P_{virtual}) & 0 \\ 0 & \sin(-P_{virtual}) & \cos(-P_{virtual}) & 0 \\ 0 & 0 & 0 & 1 \end{bmatrix} . \qquad \text{Equation 3}$$

$$\begin{bmatrix} \cos(-Y_{virtual}) & 0 & \sin(-Y_{virtual}) & 0 \\ 0 & 1 & 0 & 0 \\ -\sin(-Y_{virtual}) & 0 & \cos(-Y_{virtual}) & 0 \\ 0 & 0 & 0 & 1 \end{bmatrix}$$

The viewpoint matrix Vm may represent the rotation/position of the virtual camera, which may be associated with receiving the input of the user command Yvirtual in Equation 3 may be a yaw value of the virtual camera, and Pvirtual may be a pitch value of the virtual camera.

On the other hand, the projection matrix Pm may be prepared as follows.

$$Pm = \begin{bmatrix} \dfrac{\cot(fovy/2)}{aspect} & 0 & 0 & 0 \\ 0 & \cot(fovy/2) & 0 & 0 \\ 0 & 0 & -\dfrac{zFar}{zFar-zNear} & -\dfrac{zNear \times zFar}{zFar-zNear} \\ 0 & 0 & -1 & 0 \end{bmatrix} \quad \text{Equation 4}$$

Referring to Equation (4), fovy may refer to a vertical viewing angle of the virtual camera. In addition, aspect may also refer to a horizontal/vertical ratio (horizontal resolution/vertical resolution) of an output image. zFar and zNear may refer to maximum and minimum distances, respectively, that are expressed at the time of rendering.

The user terminal 200 may be configured to convert the image received from the vehicle 1 based on the above matrix. According to an exemplary embodiment, the converted image may be output to a display provided in the user terminal 200. Additionally, the operations described in FIGS. 4 to 6 are merely an exemplary embodiment of the disclosure. When the camera 110 obtains the image and converts the vehicle 1 into a uniform reference image and the user terminal 200 uses the image, there is no restriction on the operation.

Figure 7:
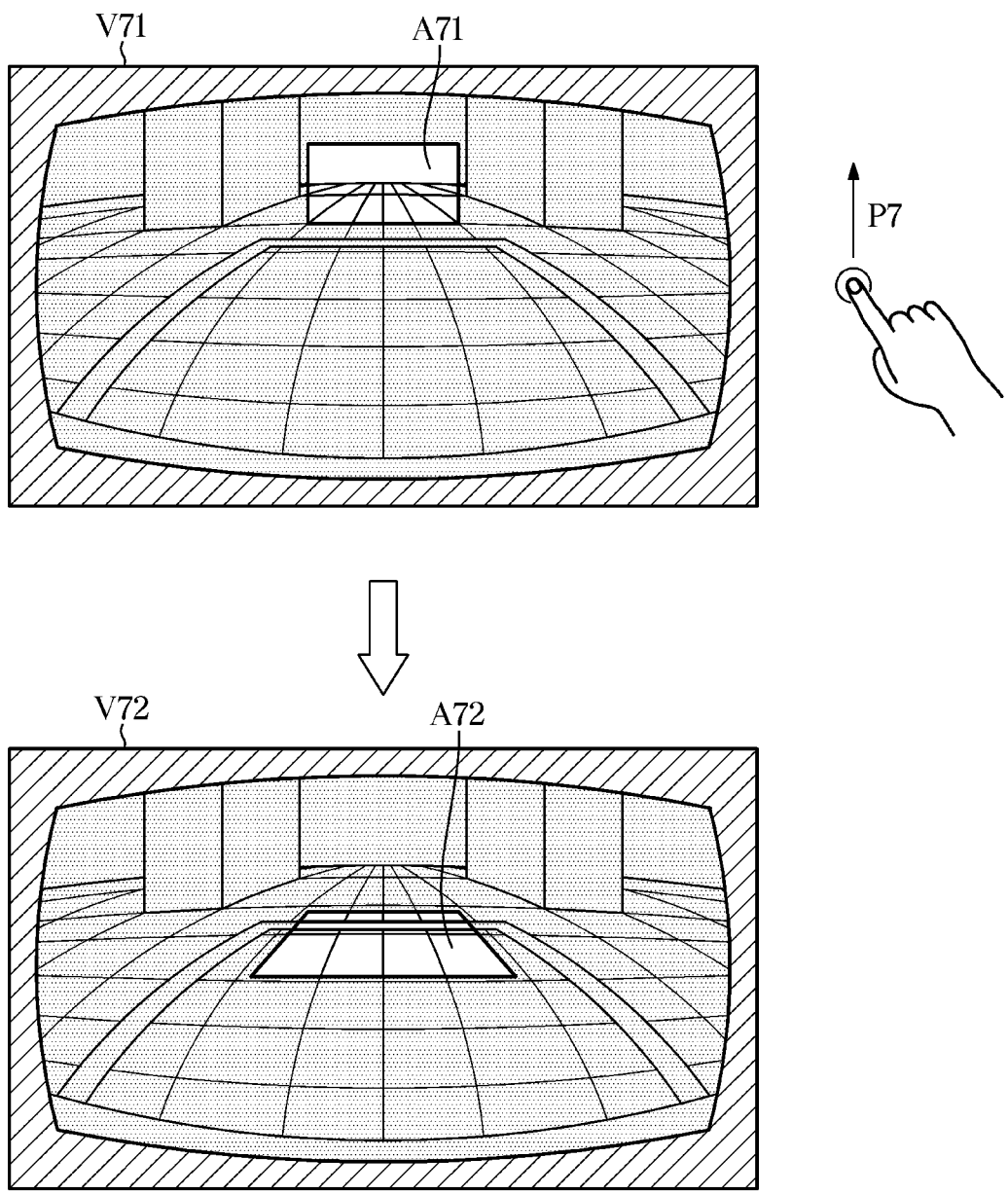
FIGS. 7 to 9 are views describing an operation of changing a viewpoint of a reference image based on a user command according to exemplary embodiments of the disclosure.
Figure 8:
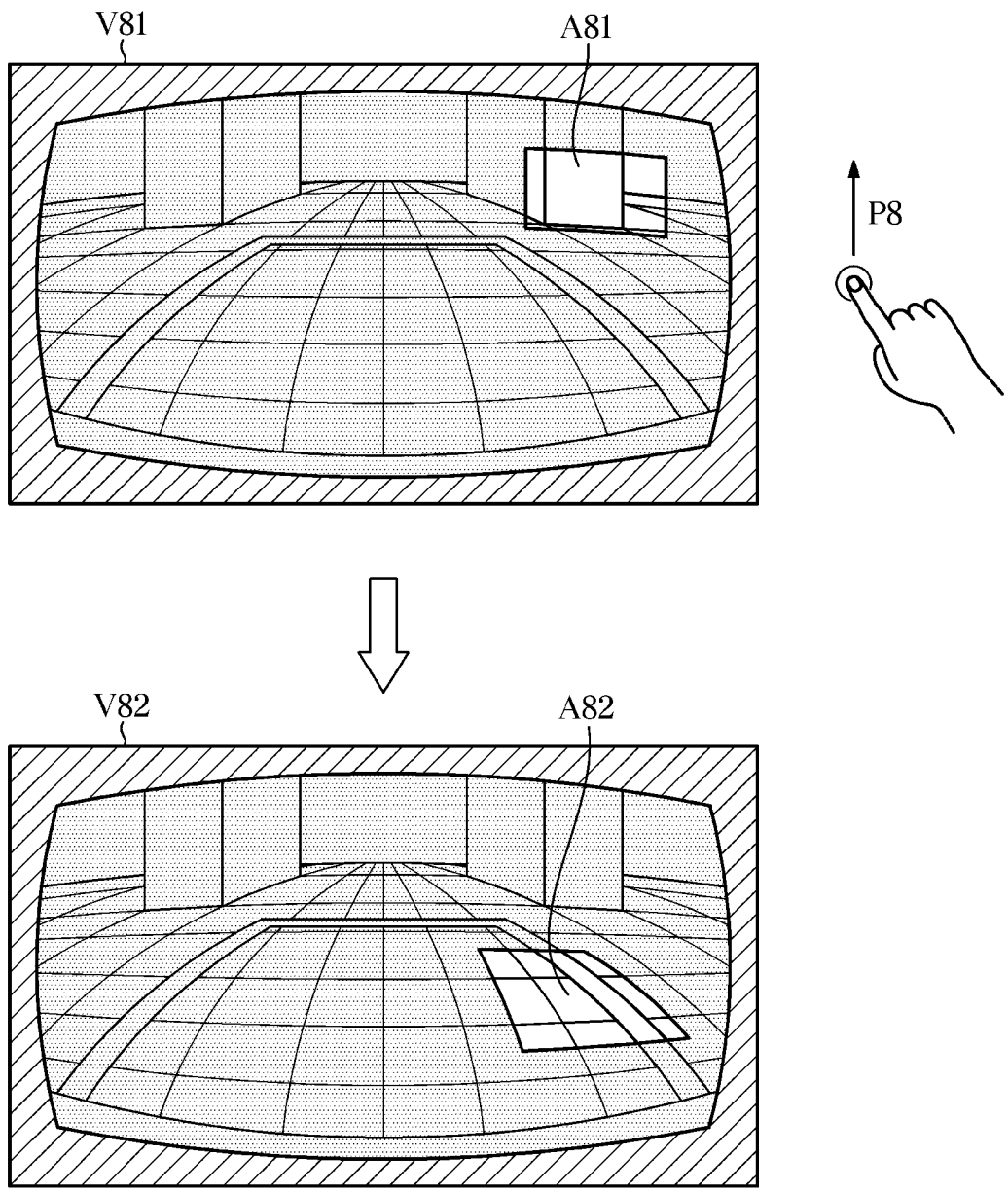
Figure 9:
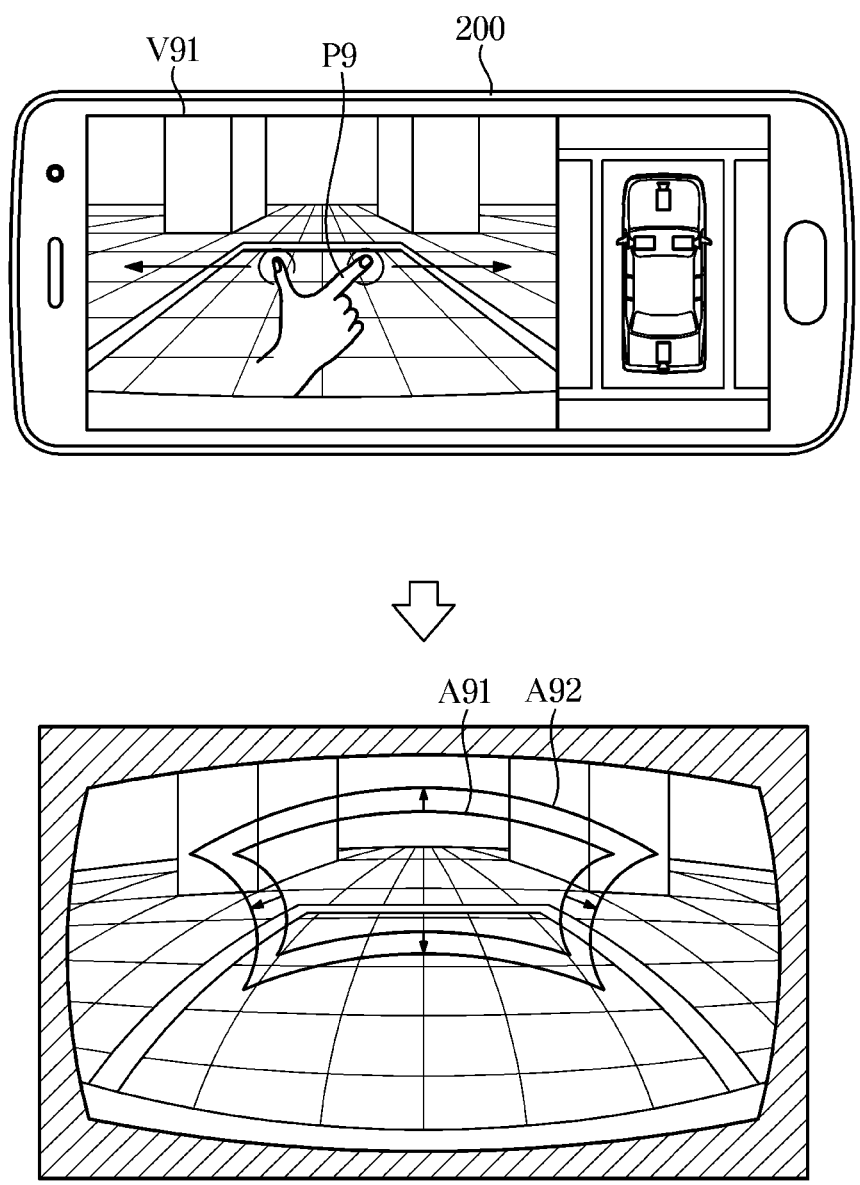

FIGS. 7 to 9 are views describing an operation of changing a viewpoint of a reference image based on a user command according to exemplary embodiments of the disclosure. Referring to FIG. 7, the user may input the user command to the user terminal 200 (P7). When the user inputs the user command to drag the image upward, the user may input the command to view the lower part of the reference image. The user terminal 200 may be configured to change the viewpoint of the reference image from a first viewpoint A71 to a viewpoint A72 that corresponds to the user command. On the other hand, the change of the viewpoint of the reference image may be performed without limitation.

Referring to FIG. 8, the user may freely change the viewpoint of the reference image (A81→A82). On the other hand, in changing the viewpoint, it may be possible to change the yaw of the viewpoint itself and output a full image. Referring to FIG. 9, the user may input the user command to enlarge or reduce the image output to the user terminal 200 (P9). In other words, the user may input the command to sweep or drag the display to the user terminal 200 to adjust the output magnification of images V91 and V92 output to the user terminal 200. The viewpoint of output based on the user's command may be changed from A91 to A92.

Based on the above-described operation, the user may change the viewpoint of the reference image, but when the user's command exceeds a predetermined range, the user terminal 200 may be configured to output the reference viewpoint at the viewpoint exceeding the range to a predetermined viewpoint. Notably, FIGS. 7 to 9 are merely examples for changing the viewpoint of the reference image, and there is no limitation on the operation of changing the viewpoint of the reference image and outputting the reference image of the desired viewpoint by the user.

Figure 10:
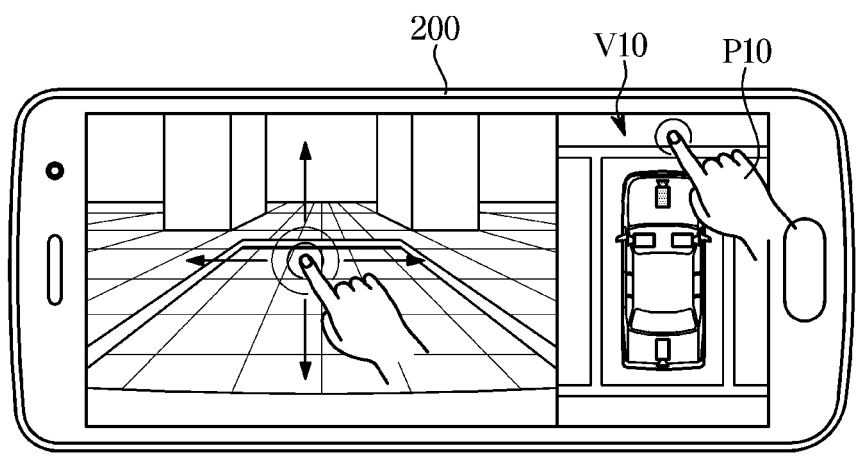
FIG. 10 is a view describing an operation of inputting an area of interest according to exemplary embodiments of the disclosure.

FIG. 10 is a view describing an operation of inputting an area of interest according to exemplary embodiments of the disclosure. Referring to FIG. 10, the user may input the user command related to an area of interest (P10). FIG. 10 illustrates that the user inputs a front face of the vehicle 1 as the area of interest. When the user terminal 200 receives the user's command, the user terminal 200 may be configured to output a reference area image V10 of the corresponding area to the user terminal 200 based on the vehicle 1.

Figure 11:
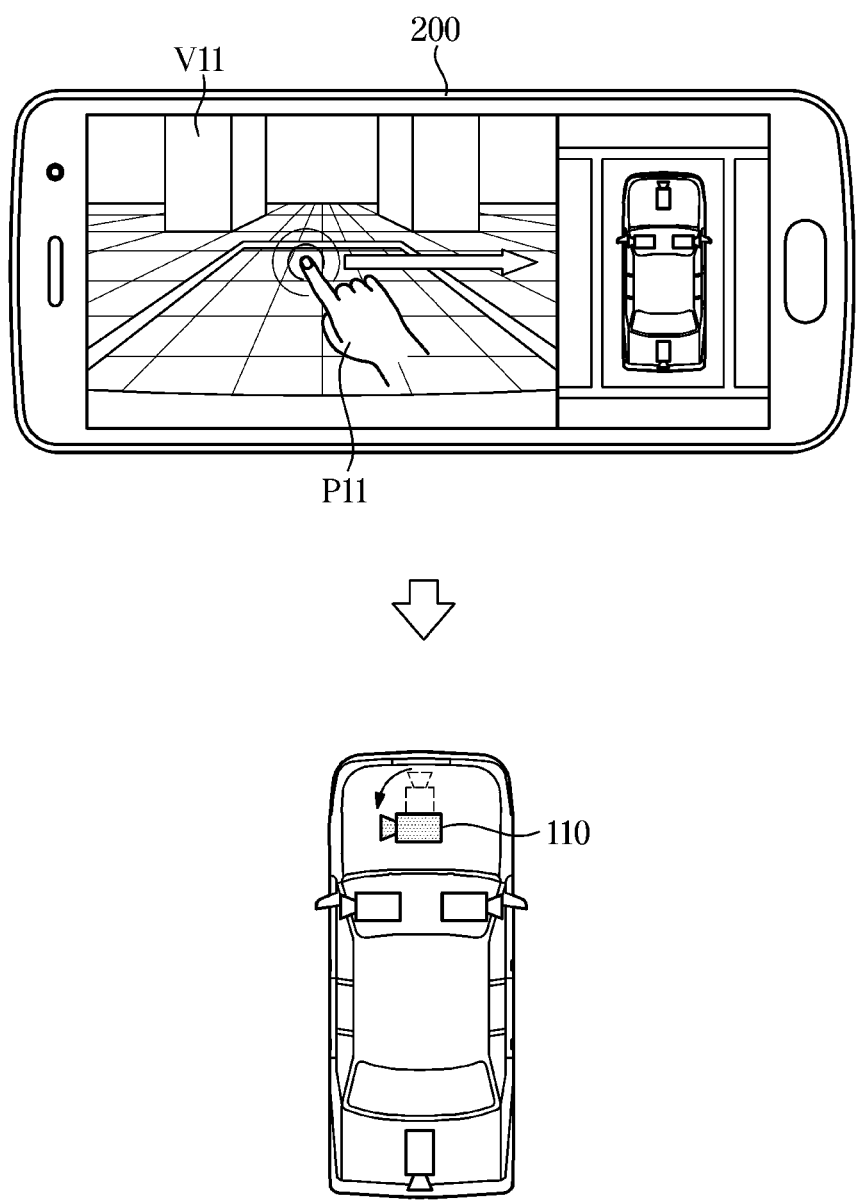
FIGS. 11 and 12 are views describing an operation of changing a viewpoint of a virtual camera according to exemplary embodiments of the disclosure.
Figure 12:
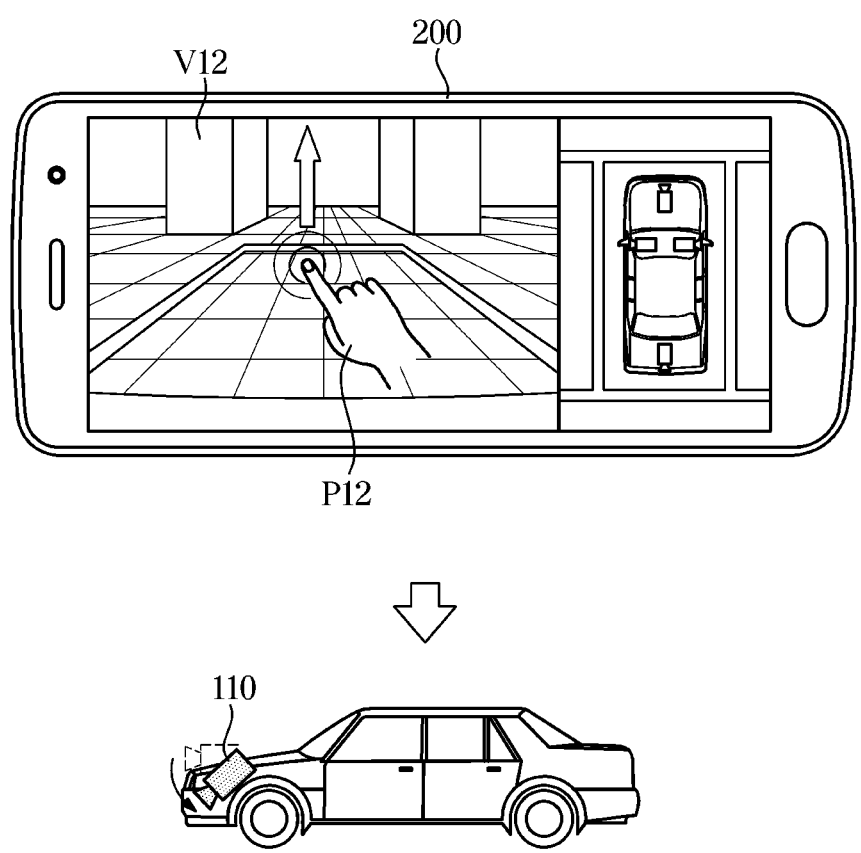

FIGS. 11 and 12 are views describing an operation of changing a viewpoint of a virtual camera according to exemplary embodiments of the disclosure. FIGS. 11 and 12 are views describing the images output in FIGS. 7 to 9, using the concept of the virtual camera. In the disclosure, an actual camera configured to directly obtain the image around the vehicle 1 and the virtual camera for changing the viewpoint may be distinguished from each other, and the operations described in FIGS. 7 to 9 may be described as changing the viewpoint of the virtual camera.

Referring to FIG. 11, the user may drag the viewpoint of a reference image V11 output from the user terminal 200 to the right, and dragging to the right is intended to output the image on the left of the image around the vehicle 1. The virtual camera may thus move the viewpoint to the left and output the reference image.

Referring to FIG. 12, the virtual camera is able to drag the viewpoint of a reference image V12 output by the user terminal 200 upward (P12), and dragging to the upward is intended to output the image below the image around the vehicle 1. The virtual camera may then move the viewpoint below and output the reference image. The operations described with reference to FIGS. 11 and 12 are merely examples for describing the output format of the reference image, and there is no limitation on the operation for changing the viewpoint of the virtual camera.

Figure 13:
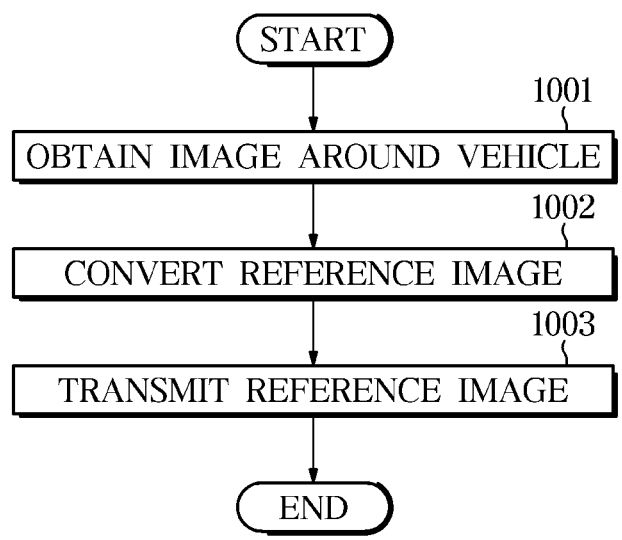
FIGS. 13 and 14 are flowcharts according to exemplary embodiments of the disclosure.
Figure 14:
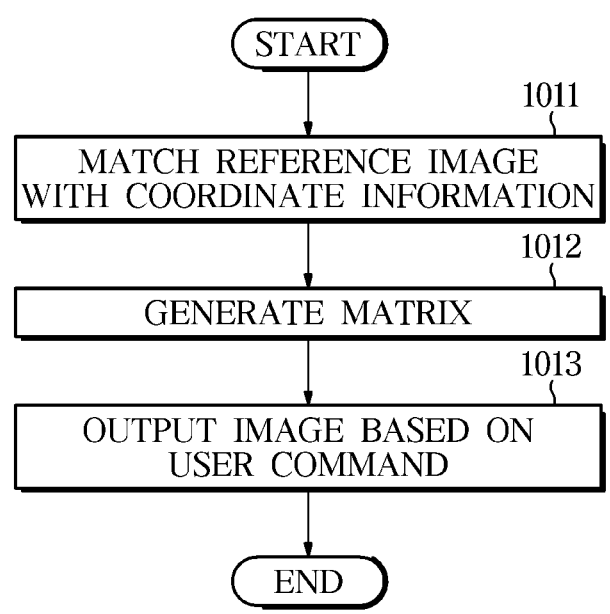

FIGS. 13 and 14 are flowcharts according to exemplary embodiments of the disclosure. FIG. 13 is a flowchart illustrating an exemplary embodiment of an operation implemented in the vehicle 1. The vehicle 1 may be configured to obtain the image around the vehicle 1 (1001). The vehicle 1 may be configured to convert the obtained image around the vehicle 1 into the reference image (1002). On the other hand, the vehicle 1 may be configured to transmit the converted reference image to the server 300 (1003).

FIG. 14 is a flowchart illustrating an exemplary embodiment of an operation implemented in the user terminal 200. Referring to FIG. 14, the user terminal 200 may be configured to match the received reference image with the coordinate information (1011). Additionally, the user terminal 200 may be configured to generate the matrix in which the coordinate information is applied to the matched reference image (1012). The user terminal 200 may be configured to output an image based on the user command to the user terminal 200 based on the above-described matrix (1013).

According to the vehicle, and the user terminal and the method of controlling the vehicle image as described above, the image obtained by the vehicle may be changed to a single reference and provided to the user terminal, thereby providing a standardized and accurate image around the vehicle.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a communicator configured to communicate with a user terminal or a server;
a camera configured to obtain a surrounding image around the vehicle; and
a controller configured to convert the surrounding image into a reference image which is an original image converted into a single fixed parameter image, and to transmit the reference image to the user terminal,
wherein the user terminal is configured to associate the reference image with predetermined coordinate information,
wherein the user terminal is configured to generate a model matrix, a viewpoint matrix, and a projection matrix,
wherein the user terminal is configured to:
convert the surrounding image into a reference image based on a product of the model matrix, the viewpoint matrix, and the projection matrix;
receive a user's command that changes the viewpoint;
change the viewpoint based on the user's command to output the reference image; and
output the reference image at a predetermined viewpoint when the user's command exceeds a predetermined range.

2. The vehicle according to claim 1, wherein the user terminal is configured to receive the user's command including an area of interest around the vehicle, and to output the reference image corresponding to the area of interest.

3. A method of controlling a vehicle image comprising:
communicating, by a communicator, with a user terminal and a server;
obtaining, by a camera, a surrounding image around a vehicle;
converting, by a controller, the surrounding image into a reference image which is an original image converted into a single fixed parameter image;
transmitting, by the controller, the reference image to the user terminal,
associating, by the user terminal, the reference image with predetermined coordinate information,
generating a model matrix, a viewpoint matrix, and a projection matrix,
converting the surrounding image into a reference image based on a product of the model matrix, the viewpoint matrix, and the projection matrix,
receiving, by a user controller, a user's command that changes the viewpoint; and
outputting, by the user controller, the reference image by changing the viewpoint based on the user's command and
outputting the reference image at a predetermined viewpoint when the user's command exceeds a predetermined range.

4. The method according to claim 3, wherein the outputting of the reference image comprises: receiving the user's command including an area of interest around the vehicle; and outputting the reference image corresponding to the area of interest.

* * * * *